United States Patent [19]
Ramskugler

[11] Patent Number: 5,224,727
[45] Date of Patent: Jul. 6, 1993

[54] ANTI-JACKKNIFING MECHANISM

[76] Inventor: Chester Ramskugler, 5000 W. Kinnickinnic River Pkwy., Milwaukee, Wis. 53219

[21] Appl. No.: 919,811

[22] Filed: Jul. 24, 1992

[51] Int. Cl.⁵ .................................. B62D 53/06
[52] U.S. Cl. .......................... 280/432; 280/455.001
[58] Field of Search .................. 280/423.1, 432–434, 280/455.1, 446.1, 474

[56] References Cited

U.S. PATENT DOCUMENTS

| | | | |
|---|---|---|---|
| 3,722,918 | 3/1973 | Conner | 280/432 |
| 3,874,699 | 4/1975 | Hayes et al. | 280/432 |
| 3,985,369 | 10/1976 | O'Leary | 280/432 |
| 4,065,149 | 12/1977 | Roth | 280/432 |
| 4,455,035 | 6/1984 | Ivony et al. | 280/432 |
| 4,494,765 | 1/1985 | Ratsko et al. | 280/432 |
| 4,583,756 | 4/1986 | Hormurg et al. | 280/432 |
| 4,585,248 | 4/1986 | Miller et al. | 280/432 |
| 4,700,966 | 10/1987 | Hawkins et al. | 280/432 |
| 4,720,118 | 1/1988 | Schultz et al. | 280/432 |
| 4,744,581 | 5/1988 | Cables | 280/432 |
| 4,775,165 | 10/1988 | Grovum | 280/432 |
| 4,784,403 | 11/1988 | Hawkins et al. | 280/432 |
| 4,826,198 | 5/1989 | Herbert | 280/432 |

Primary Examiner—Edwin L. Swinehart
Attorney, Agent, or Firm—Wheeler Law Firm

[57] ABSTRACT

An anti-jackknifing system for use on a tractor having a fifth wheel and a trailer having a trailer pin. The anti-jackknifing system is made of a non-cylindrical pin attached to the existing trailer pin, and a freely rotating brake disk mechanism. The brake disk mechanism has a central shaft and a brake disk attached to the central shaft. A non-cylindrical opening at the top of the central shaft couples the trailer to the brake disk mechanism so that the brake disk mechanism rotates when the trailer rotates. When the tractor brakes are applied, a braking system stops rotation of the brake disk.

17 Claims, 3 Drawing Sheets

ANTI-JACKKNIFING MECHANISM

BACKGROUND OF THE INVENTION

The present invention relates to the field of anti-jackknifing devices for tractor/trailer systems. Specifically, it relates to an anti-jackknifing system that automatically engages when the tractor driver applies the tractor brakes.

The standard method for coupling a trailer and a tractor is through use of a tractor fifth wheel and trailer pin. This coupling allows the trailer to rotate freely with respect to the tractor. Because of this freedom to rotate, trailers have a tendency to rotate out of control during sudden stops or sharp turns of the tractor. This condition is known as jackknifing.

Many references to anti-jackknifing systems are known. The inventor, however, knows of none which have the unique characteristics and simplicity of the present invention. For example, U.S. Pat. No. 4,826,198 (Herbert) teaches a plural braking means, using three calipers instead of one. The central of the three calipers locks on to a control ring when the tractor brakes are applied, but does not stop rotation of the trailer. It only allows the control ring to rotate about its axis. The outer calipers engage only when sensors detect angular movement of the control ring toward either of the angular stops placed partially around the edge of the control ring. Herbert therefore teaches a detection system which only engages a caliper to stop jackknifing when a jackknifing situation has already occurred. Furthermore, the system in Herbert requires three calipers, one of which only serves to allow rotation of the control ring. This differs from the present invention in several respects. The present invention uses a single caliper instead of three calipers. This is antithetical to the teaching of Herbert. The single caliper of the present invention provides all the braking power the system needs. Application of the tractor brakes triggers an immediate response to a potentially dangerous situation. The present invention can stop a jackknifing situation as it begins.

In addition, the brake between the tractor and trailer in Herbert is not engageable at all times when coupled. Angular motion of the control ring toward the angular stops is required before the system will engage. The present invention makes an actual connection between the modified trailer pin and the brake disk mechanism brakeable at any time. This eliminates the need for multiple calipers. The actual physical connection between the modified trailer pin and brake disk mechanism allows the anti-jackknifing device to be immediately responsive to a dangerous situation.

The present invention eliminates the need for further complicated devices to enable an anti-jackknifing system. Since it uses fewer components, it is necessarily simpler and more cost effective than other anti-jackknifing systems.

U.S. Pat. No. 4,775,165 (Grovum) teaches a detection system for actuating an anti-jackknifing system. The system in Grovum is fluid actuated, using fluid actuated cylinders to move stop pins into a jackknife limiting position. Grovum teaches a system which uses orientation of the steering wheels of the tractor to the trailer to detect a jackknife condition. The present invention needs no such detection scheme. It is actuated when the tractor driver applies the tractor brakes. The means for stopping the rotation of the trailer are also different. The present invention uses a caliper system to stop rotation of the brake trailer, whereas Grovum uses stop members which extend upward from the tractor, abruptly engaging abutments which extend downward from the trailer. As in Herbert, there is also no physical connection by the anti-jackknifing system between the tractor and trailer until after a jackknife situation has been detected, and engagement is abrupt and total.

U.S. Pat. No. 4,744,581 (Cables) teaches a curved, geared tracking bar which translates circular motion of a trailer with respect to a tractor into linear motion. There is no interaction between the fifth wheel and trailer pin in Cables. The present invention, as stated above, uses an addition to the existing trailer pin in conjunction with a brake disk mechanism creating a physical connection between the trailer pin and the brake disk mechanism.

U.S. Pat. Nos. 4,455,035 (Ivony et al.), 4,494,765 (Ratsko et al.) and 4,700,966 (Hawkins et al.) use electric circuits for control systems to detect a jackknife situation. The present invention uses no such electric control system. It is actuated immediately upon application of the tractor brakes.

U.S. Pat. Nos. 4,585,248 (Miller et al.), 4,784,403 (Hawkins et al.) and 4,790,556 (Hawkins et al.) all teach the use of separate hydraulic systems to control jackknifing of a tractor/trailer combination. The present invention uses a caliper system without the need for complicated extra systems using electronics or hydraulics. By eliminating the need for added systems, the present invention reduces costs and is simpler to use, manufacture, and install than other anti-jackknifing systems.

It is an objective of this invention to provide an anti-jackknifing system which actuates immediately upon actuation of the tractor brakes. This result is desired because many prior art systems do not act to prevent jackknifing until the jackknifing situation is well underway.

It is another objective of this invention to provide an anti-jackknifing system which is effective, yet simple and relatively inexpensive.

It is a further objective of this invention to provide an anti-jackknifing system which requires no extensive modification of either the tractor or trailer.

DEFINITION OF TERMS

For the purposes of clarity the terms given below shall be interpreted throughout the specification and the claims as having the following definitions. Should there be any contradiction between the meanings given the terms herein and their common meanings the terms shall be interpreted as having both meanings.

Double: A tractor trailer combination in which the trailer attached to the tractor has another trailer attached to its back end.

SUMMARY OF THE INVENTION

The present invention is an anti-jackknifing system for use on a tractor having a fifth wheel and a trailer having a trailer pin. The normal tractor/trailer assembly is coupled by the engagement of the tractor fifth wheel and the trailer pin. The present invention works in conjunction with the fifth wheel and trailer pin.

The anti-jackknifing system comprises a non-cylindrical pin fastened to the trailer pin, a freely rotating brake disk mechanism and a system for actuating a caliper from the tractor. The non-cylindrical pin is fastened to the trailer pin. The freely rotating brake disk mechanism has a central shaft, a brake disk, and a caliper. The top of the central shaft has an opening which the non-cylindrical pin engages when the tractor and trailer are coupled. The brake disk mechanism mounts to the tractor fifth wheel. The central shaft of the brake disk mechanism connects to the brake disk. The caliper is positioned so that it will brake the rotation of the brake disk when actuated.

The caliper comprises a first arm, a second arm, brake pads attached to the first end of each arm, a pivot point, an air cylinder, and a return spring. When the tractor driver actuates the caliper from the tractor, the expansion pressure of the air cylinder causes the arms to move, extending the return spring, and pressing the brake pads against the brake disk. When the air pressure is no longer supplied to the caliper, the return spring contracts, moving the brake pads out of contact with the brake disk. In the alternative, a wedge type caliper actuating system may be used to drive the pad to brake the brake disk. Also in the alternative, a drum brake system may be substituted for the caliper brake.

The system for actuating the caliper from the tractor actuates by supplying pressure to the fifth wheel brake cylinder as well as to the wheel cylinders when the tractor driver applies the tractor brakes. When the tractor driver releases the tractor brakes, the caliper releases because of the return spring contraction. Any known system for actuating a brake may be used.

The anti-jackknifing system works in the following manner. The engagement of the non-cylindrical pin and the non-cylindrical opening cause the brake disk mechanism to rotate when the trailer rotates. When the tractor driver actuates the brakes, the air cylinder is expanded and the caliper arms press the brake pads into contact with the brake disk, braking the rotation of the brake disk mechanism and thus braking the rotation of the trailer.

These and other benefits of the present invention will become apparent from the following detailed description thereof taken in conjunction with accompanying drawings.

DESCRIPTION OF THE DRAWINGS

Referring to the drawings.

DETAILED DESCRIPTION

Although the disclosure hereof is detailed and exact to enable those skilled in the art to practice the invention, the physical embodiments herein disclosed merely exemplify the invention which may be embodied in other specific structure. While the preferred embodiment has been described, the details may be changed without departing from the invention, which is defined by the claims.

Figure 1:
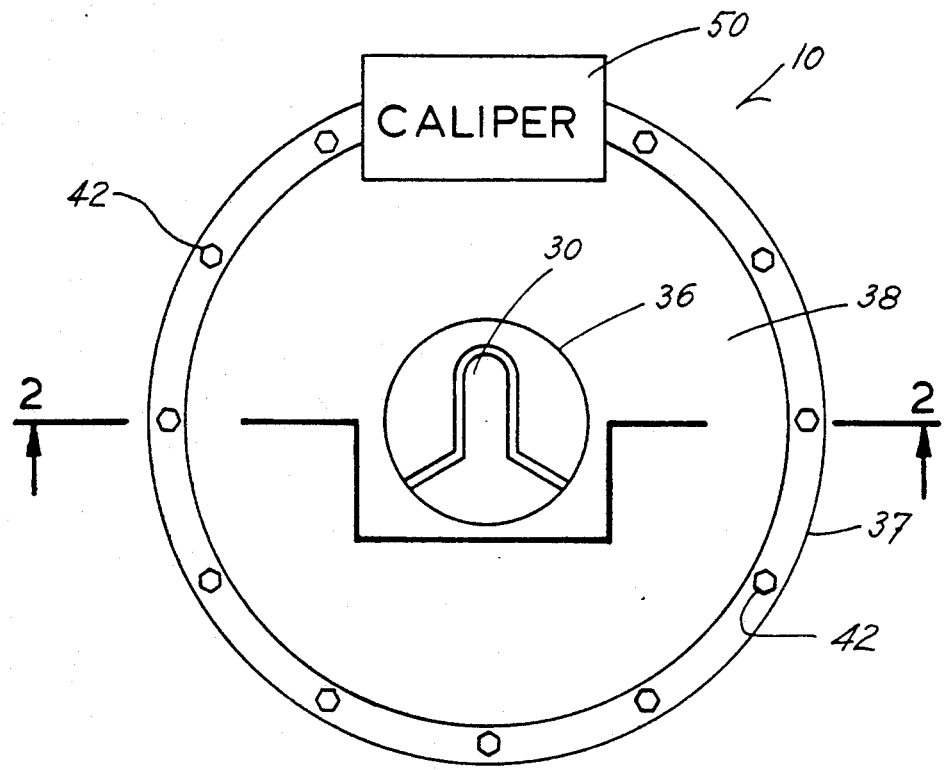
FIG. 1 illustrates a top view of the brake disk mechanism showing the caliper box, the non-cylindrical opening that the non-cylindrical pin engages, and the fasteners for the housing.
Figure 2:
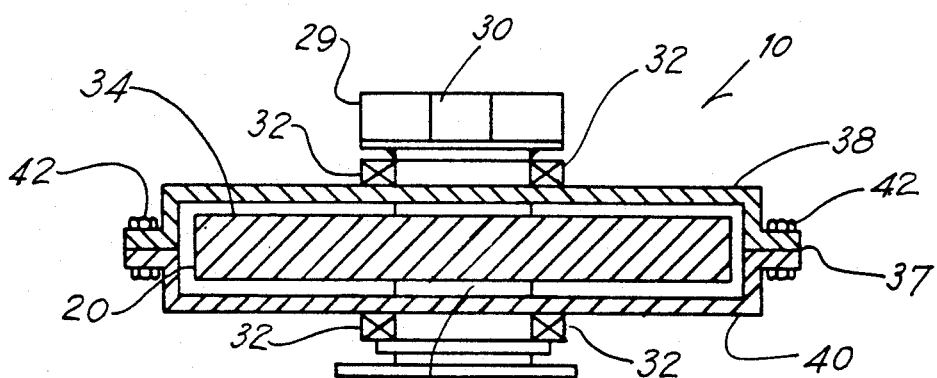
FIG. 2 illustrates a cross-sectional view of the brake disk mechanism and the housing from line 2—2 of FIG. 1.

Referring to FIGS. 1 and 2, the anti-jackknifing system 10 includes a brake disk mechanism 20 and a housing 37. The housing 37 consists essentially of an upper section 38 and a lower section 40 which enclose the central shaft 36, brake disk 34 and caliper 50 (See FIGS. 1, 5, and 6). The top 29 of the central shaft 36 has an opening 30 (See FIG. 2). A non-cylindrical pin 90, attached to the trailer pin, engages this opening 30 (See FIG. 2).

Figure 9:
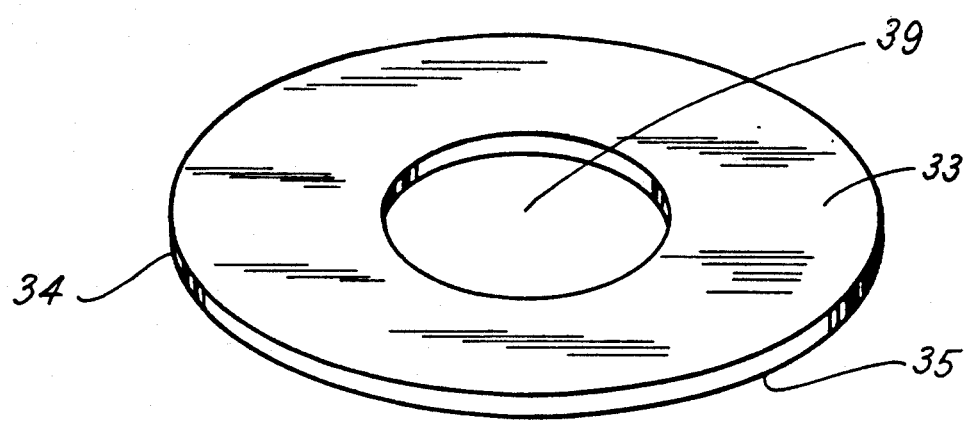
FIG. 9 illustrates a perspective view of the brake disk.

Referring to FIG. 9, it may be seen that the brake disk 34 has an opening 39 at its center. The opening 39 allows the brake disk 34 to be mounted on and connected to the central shaft 36. These two structures may be made integral with each other.

Referring back to FIGS. 1 and 2 it may be seen that the upper section 38 and lower section 40 are connected to each other by a plurality of bolts 42 around the outside rim 41 of the housing 37. Referring to FIGS. 1 and 2, it may also be seen that sealed bearings 32 are mounted on the top section 38 and bottom section 40 of the housing. The bearings 32 allow free rotation of the central shaft 36 and the brake disk 34 inside the housing 37.

Figure 7:
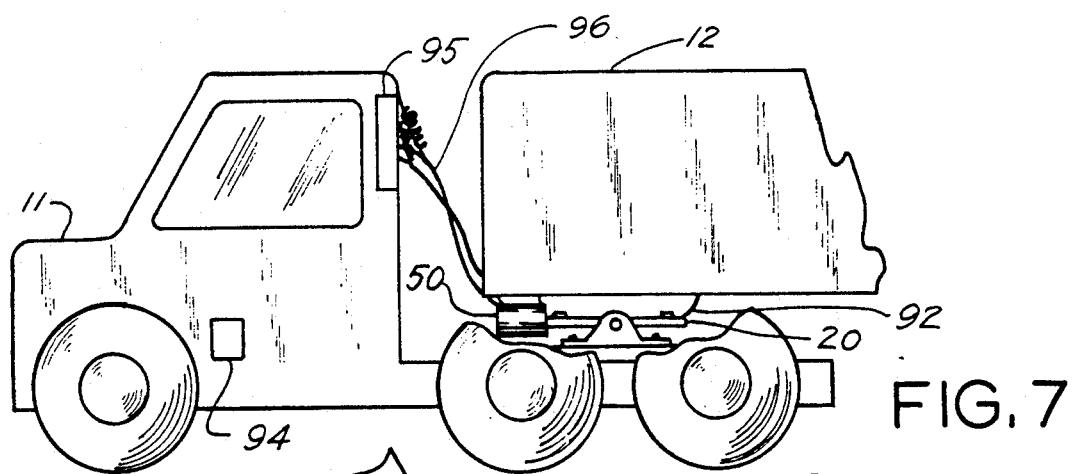
FIG. 7 illustrates the relative positions of the systems in FIGS. 1, 3, 5 and 6.
Figure 10:
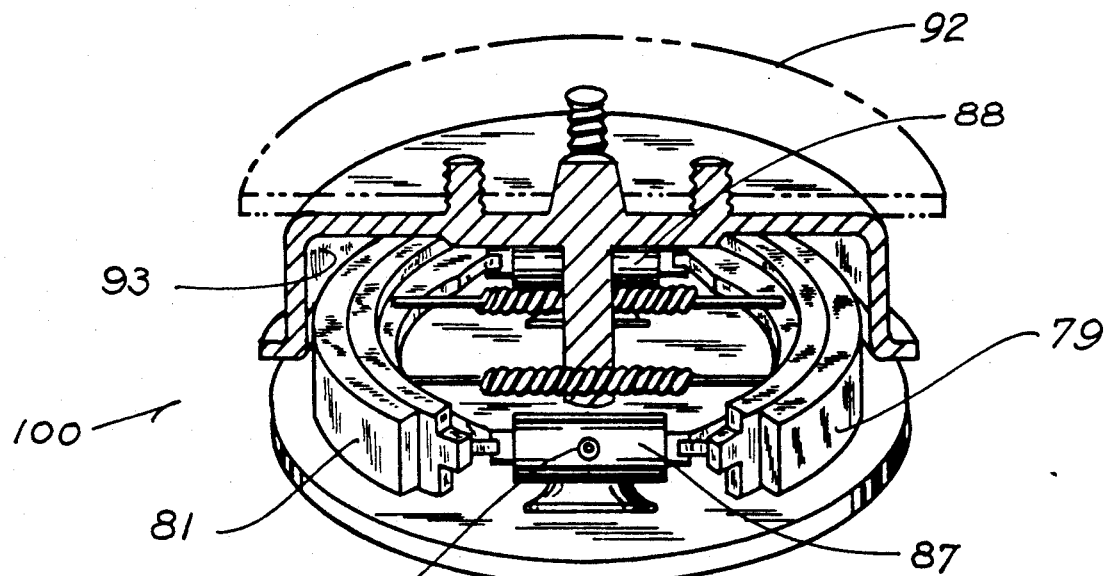
FIG. 10 illustrates a perspective view of the alternative drum brake system.

As may be seen in FIGS. 7 and 10, the brake disk mechanism 20 fits under the fifth wheel 92 of the tractor 11. The fifth wheel 92 is removed from the tractor 11. The brake disk mechanism 20 is mounted to the tractor 11. The fifth wheel 92 is then remounted to the top of the brake disk mechanism 20. When the trailer 12 couples with the tractor 11, the non-cylindrical pin 90, which extends downward from the trailer pin 91, engages the non-cylindrical opening 30. The trailer pin 91 couples the trailer 12 to the tractor 11 by engaging the fifth wheel 92 in a known and standard manner.

Figure 3:
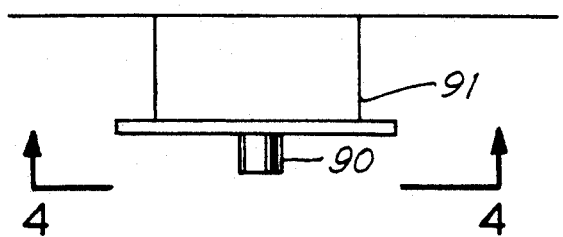
FIG. 3 illustrates a side view of the existing trailer pin with the added non-cylindrical pin.
Figure 4:
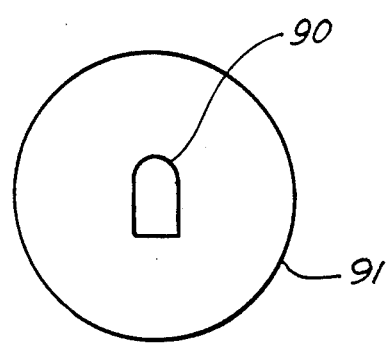
FIG. 4 illustrates a bottom view of the shape of the non-cylindrical trailer pin from line 4—4 of FIG. 3.

Referring to FIGS. 3 and 4, the non-cylindrical pin 90 is mounted to the bottom of the existing trailer pin 91.

Figure 5:
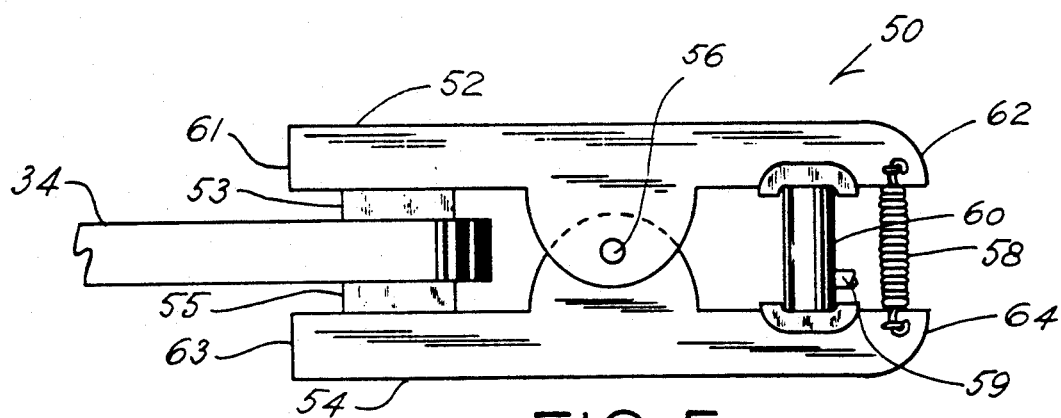
FIG. 5 illustrates a side view of the scissors type caliper system and the brake disk.

Referring to FIG. 5, the caliper 50 of the brake disk mechanism 20 has a first arm 52 and a second arm 54 that are connected to each other at a pivot point 56. Located near the first ends 61 and 63 of the first arm 52 and the second arm 54 are brake pads 53 and 55. Located near the second ends 62 and 64 of the first arm 52 and the second arm 54 is a return spring 58. Located between the return spring 58 and the pivot point 56 is an air cylinder 60 that is supplied with pressure through passage 59 whenever the brake is applied the air cylinder 60 actuates, in a known and standard manner, when the tractor driver applies or releases the brakes 94 or activates a switch or control for that purpose, the arms 52 and 54 of the caliper 50 so that the brake pads 53 and 55 engage and contact the top surface 33 and bottom surface 35 of the brake disk 34 thereby preventing the tractor 11 and trailer 12 from jackknifing.

When the air cylinder 60 is no longer pressurized, and contracts, the return spring 58 contracts and causes the brake pads 53 and 55 to move out of contact with the brake disk 34. When the air cylinder 60 expands due to pressure supplied through passage 59, the expansion force of the air cylinder 60 exceeds the return force of the return spring 58 and forces the brake pads 53 and 55 to press against the brake disk 34.

Figure 6:
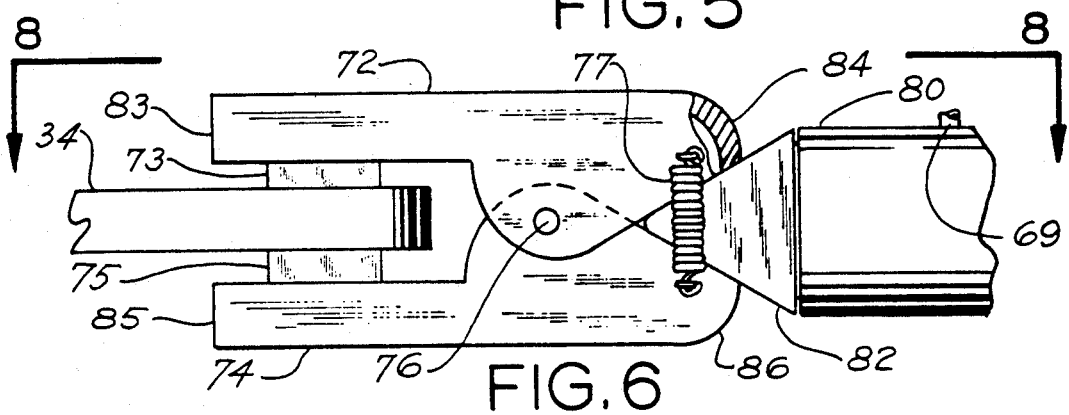
FIG. 6 illustrates a side view of the alternative wedge type caliper system and the brake disk.
Figure 8:
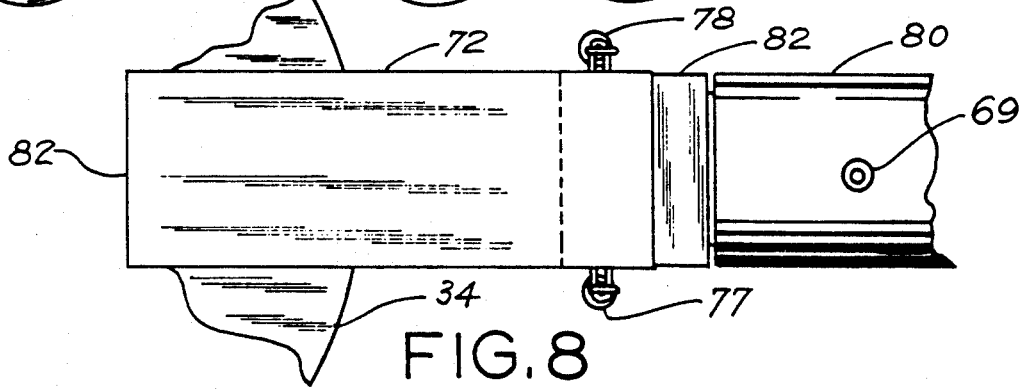
FIG. 8 illustrates a top view of the caliper system from line 8—8 of FIG. 6.

Referring to FIGS. 6 and 8, the caliper 70, an alternative embodiment of the caliper 50 may be seen. The caliper 70 has a first arm 72 and a second arm 74 that are connected to each other at a pivot point 76. Near the first ends 83 and 85 of the first arm 72 and the second arm 74 are brake pads 73 and 75. Near the second ends 84 and 86 of the first arm 72 and the second arm 74 are return springs 77 and 78, one spring on each side of the arms 72 and 74. An air cylinder 80 is attached to a wedge 82 at the second end 84 and 86 of each arm 72 and 74. The air cylinder 80 expands when it is supplied with pressure through passage 69 by the tractor driver's application of the brakes 94. The air cylinder 80 contracts, as described above, when the tractor driver releases the brakes 94. When the air cylinder 80 contracts, the return springs 77 and 78 cause the arms 72 and 74 to push the wedge 82 out of a gap 71 between the second ends 84 and 86 of the first and second arms 72 and 74. When the air cylinder 80 expands, the expansion forces wedge 82 into the gap 71 between the second ends 84 and 86 of the first and second arms 72 and 74, forcing the brake pads 73 and 75 to press against the brake disk 34.

Alternatively, the brake disk 34 could be hollow and the system could use a drum brake 100 as shown in FIG. 10 to stop rotation of the brake disk mechanism 20. The drum brake 100 fits under the fifth wheel 92 of the tractor 11. The fifth wheel 92 is removed from the tractor 11. The drum brake 100 is mounted to the tractor 11. The fifth wheel 92 is then remounted to the top of the drum brake 100. The drum brake 100 is actuated in standard fashion by the supplying of pressure to double piston cylinder 87 through passage 89, and similarly to double piston cylinder 88, by an actuating system 95 when the tractor driver applies the brakes 94. The air cylinders 87 and 88 expand, pushing brake pads 79 and 81 against the inside 93 of the drum brake 100.

Referring to FIG. 7, it may be seen that the actuating system 95 connects by cables 96 to the caliper 50. When the tractor driver applies and releases the brakes 94, the actuating system 95 actuates the caliper 50 by applying pressure through passage 59 to cause the air cylinder 60 to expand, forcing the arms 52 and 54 to press the brake pads 53 and 55 against the brake disk 34, braking the rotation of the brake disk 34. The actuating system 95 may use standard hydraulics as an alternative to the air cylinder 60.

The device operates in the following manner. The caliper 50 is positioned so that the brake pads 53 and 55 press down on the brake disk 34 when the air cylinder 60 expands. Ideally, the air cylinder 60 expands because of pressure supplied through passage 59 when the tractor driver applies the brakes 94 in the tractor 11. The brake disk 34 is then unable to rotate, and the engagement between the non-cylindrical pin 90 and the non-cylindrical opening 30 prevents the trailer from jackknifing.

The invention 10 is not limited to single trailer rigs. The invention 10 may also be used for the first trailer of a double or for both trailers of a double, and in other situations that are apparent to a person of ordinary skill in the art, given this disclosure.

The above described embodiments of this invention are merely descriptive of its principles and are not to be limited. The scope of this invention instead shall be determined from the scope of the following claims, including their equivalents.

What is claimed is:

1. An anti-jackknifing system, for a tractor having a fifth wheel and trailer having a trailer pin, the tractor and trailer coupled by the engagement of the tractor fifth wheel and the trailer pin, the anti-jackknifing system comprising:
   a non-cylindrical pin mounted to the trailer pin;
   a freely rotating brake disk mechanism, mounted to the fifth wheel of the tractor, having a central shaft and a brake disk;
   the brake disk being connected to the central shaft;
   the central shaft having a top including a non-cylindrical opening;
   the non-cylindrical pin mounted on the trailer pin being engaged with the non-cylindrical opening;
   braking means for braking rotation of the brake disk;
   the braking means being mounted and positioned to engage the brake disk;
   an actuating means for actuating the braking means from the tractor.

2. The anti-jackknifing system of claim 1, further comprising a housing:
   the housing enclosing the central shaft, the brake disk and the braking means.

3. The anti-jackknifing system of claim 1, wherein the braking means is a disk brake.

4. The anti-jackknifing system of claim 1, wherein actuating means for actuating the braking means is hydraulic.

5. The anti-jackknifing system of claim 1, wherein the actuating means for actuating the braking means is an air cylinder.

6. The anti-jackknifing system of claim 2, wherein the housing comprises:
   an upper section and a lower section;
   the upper section and the lower section being connected by a plurality of fasteners.

7. The anti-jackknifing system of claim 6, wherein the fasteners are bolts.

8. The anti-jackknifing system of claim 1, where the trailer is the first of two trailers in a double.

9. The anti-jackknifing system of claim 1, wherein two are used, one on each of the two trailers of a double.

10. An anti-jackknifing system, for a tractor having a fifth wheel and trailer having a trailer pin, the tractor and trailer coupled by the engagement of the tractor fifth wheel and the trailer pin, the anti-jackknifing system comprising:
   a non-cylindrical pin fastened to the trailer pin;
   a freely rotating brake disk mechanism having a central shaft, a brake disk, and a caliper;
   the central shaft having a top including a non-cylindrical opening that the non-cylindrical pin engages;
   the brake disk, having a top and a bottom, being connected to the central shaft;
   the caliper having a first arm with a first end and a second end, and a second arm with a first end and a second end, each arm having at its first end a brake pad;
   the first arm connected to the second arm at a pivot point;
   the first end of the first arm being positioned above the top of the brake disk, and the first end of the second arm being positioned below the bottom of the brake disk;

an actuating means for actuating the caliper from the tractor;

whereby when the caliper is actuated, the caliper arms press the brake pads onto the top and the bottom of the brake disk, preventing jackknifing of the trailer.

11. The anti-jackknifing system of claim 10, further comprising a housing:

the housing enclosing the central shaft, the brake disk and the caliper.

12. The anti-jackknifing system of claim 11, wherein the housing comprises:

an upper section and a lower section;

the upper section and the lower section being connected by a plurality of fasteners.

13. The anti-jackknifing system of claim 12, wherein the fasteners are bolts.

14. The anti-jackknifing system of claim 10, where the trailer is the first of two trailers in a double.

15. The anti-jackknifing system of claim 10, wherein two are used, one on each of the two trailers of a double.

16. An anti-jackknifing system, for a tractor having a fifth wheel and trailer having a trailer pin, the tractor and trailer coupled by the engagement of the tractor fifth wheel and the trailer pin, the anti-jackknifing system comprising:

a non-cylindrical pin mounted to the trailer pin;

a freely rotating brake disk mechanism, mounted to the fifth wheel of the tractor, having a central shaft and a drum brake;

the drum brake being connected to the central shaft;

the central shaft having a top including a non-cylindrical opening;

the non-cylindrical pin mounted on the trailer pin being engaged with the non-cylindrical opening;

an actuating means for actuating the drum brake from the tractor.

17. The anti-jackknifing system of claim 16, further comprising a housing:

the housing enclosing the central shaft and the drum brake.

* * * * *